United States Patent [19]
Adler

[11] 3,932,701
[45] Jan. 13, 1976

[54] SELF-COMPENSATING FOCUS SYSTEM FOR A REFLECTIVE VIDEO DISC

[75] Inventor: Robert Adler, Northfield, Ill.

[73] Assignee: Zenith Radio Corporation, Chicago, Ill.

[22] Filed: Jan. 29, 1975

[21] Appl. No.: 545,072

[52] U.S. Cl........ 178/6.6 R; 178/6.7 A; 179/100.3 V
[51] Int. Cl.²............................................ H04N 5/76
[58] Field of Search ......... 179/100.3 V; 178/6.6 R, 178/6.6 DD, 6.7 R, 6.7 A, DIG. 29; 250/200, 201, 202, 203 R; 352/26, 103

[56] References Cited
UNITED STATES PATENTS

| | | | |
|---|---|---|---|
| 2,972,660 | 2/1961 | Toulon | 178/6.7 A |
| 3,673,412 | 6/1972 | Olson | 250/201 |
| 3,743,395 | 7/1973 | Preuss | 352/22 |
| 3,833,769 | 9/1974 | Compaan et al. | 179/100.3 V |
| 3,848,095 | 11/1974 | Wohlmut et al. | 179/100.3 V |
| 3,873,763 | 3/1975 | Janssen | 178/6.6 R |
| 3,876,841 | 4/1975 | Kramer et al. | 179/100.3 V |
| 3,876,842 | 4/1975 | Bouwhuis | 178/6.7 A |

OTHER PUBLICATIONS

Rice et al., An Experimental Television Recording And Playback System Using Photographic Discs, Jour. of the S.M.P.T.E. Vol. 79, No. 11, 11/70, pp. 997–1002.

*Primary Examiner*—Raymond F. Cardillo, Jr.
*Attorney, Agent, or Firm*—Cornelius J. O'Connor

[57] ABSTRACT

An optical video playback device has an optical system for reading discs with a laser and further has a self-compensating focusing feature. This avoids the need for focus servos and the like to maintain proper conditions of focus.

9 Claims, 6 Drawing Figures

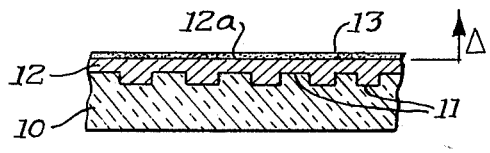
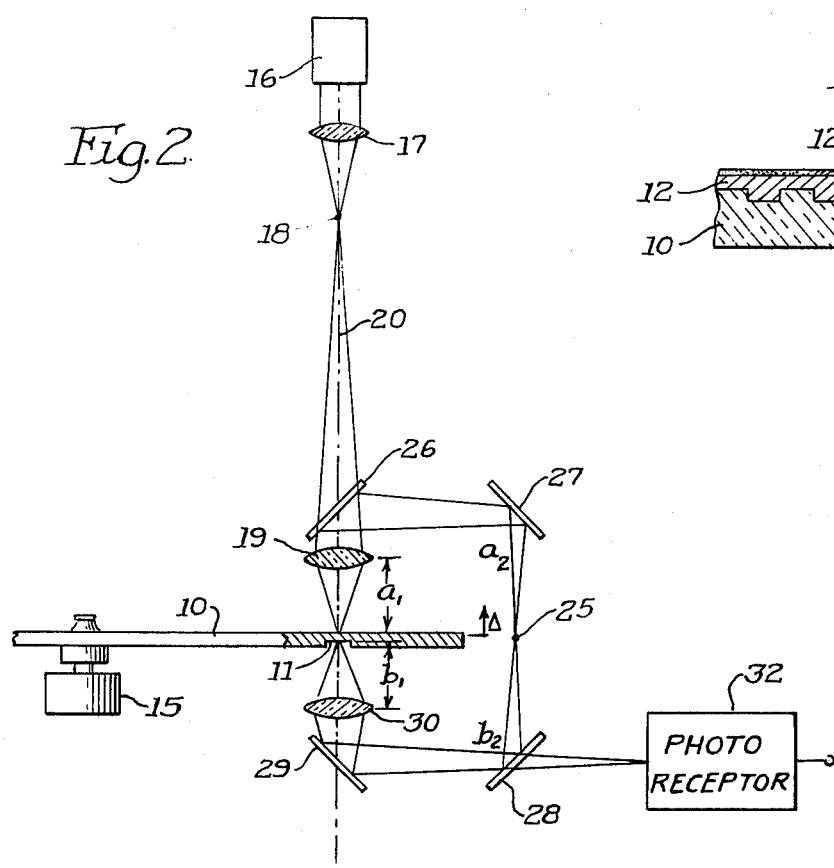
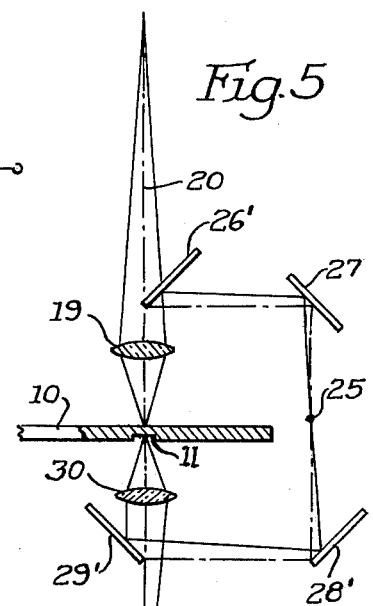
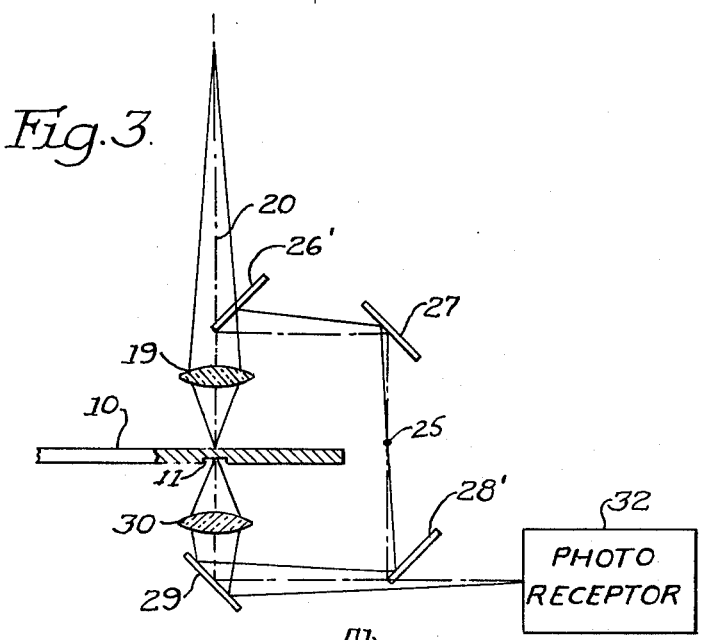
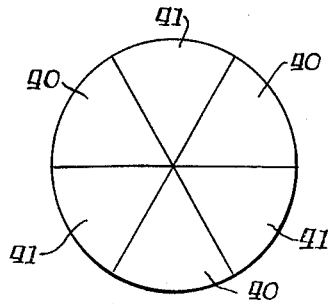
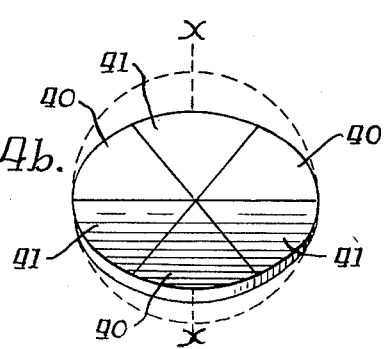

SELF-COMPENSATING FOCUS SYSTEM FOR A REFLECTIVE VIDEO DISC

Background of the Invention

An optical video playback device for reading program records, such as video discs, is known and is favored because it makes possible features that are beyond the capability of other playback devices, such as the pressure and capacitive types, at least in the present state of the art. For example, with the optical device, stop-frame, variable speed image reproduction and paging are all readily attainable and their functions may be performed with no impairment of the video disc being played.

At the same time, the optical player has one disadvantage compared with other types of video playback systems, namely, the need for carefully maintaining the disc within a reading or reference plane in order that the reading laser beam may be maintained properly focused on the disc. Obviously, where there is a mechanical coupling of the readout device with the disc, as is the case with both the pressure and capacitive systems, there is no such position requirement for the disc. This need of the optical playback device has been satisfied previously by the use of servo systems or aerodynamic stabilizers.

The servo system must be capable of sensing the instantaneous position of the disc to develop an error signal where out-of-focus conditions prevail. The error signal, after amplification in the servo system, is used to physically displace some component, such as a lens, to restore and maintain proper focus. Servo systems of this type may serve the need but they are expensive and have the disadvantage of requiring the physical displacement of some movable element. This, preferably, should be avoided.

The alternative approach of an aerodynamic stabilizer utilizes carefully shaped stabilizing elements operating upon aerodynamic principles to keep a flying disc, that is to say, a rapidly rotating vido disc, in the focal plane of the reading laser. In theory, this, too, satisfies the focus control need but the close mechanical tolerance of the stabilizing elements makes the approach difficult for mass production. It is also found that for such stabilizers to be really effective the video discs must be of controlled thickness and have very flat surfaces.

Objects of the Invention

Clearly, it is highly desirable to provide an improved arrangement for maintaining the beam properly focused on the video disc during readout and such is a principal object of the present invention.

It is another object of the invention to achieve focus control with structures that are simplified and lend themselves more suitably to mass production than those of the prior art.

Summary of the Invention

In accordance with the invention, a self-compensating focus system is provided for an optical video playback device which reads a program record that is reflective to the reading beam, which record has one surface that is simply a reflector and an opposite surface through which a reading beam may gain access to an information storage track that is backed by a reflecting surface. The system has means, including a first objective lens disposed across a first optical path, for focusing a reading beam on said one surface of the record. Other means, including a plurality of at least partially reflecting surfaces, direct energy reflected from that one surface of the record and returned through the first lens. The deflected energy travels along a second optical path in which it is brought to an intermediate focus and finally is directed to said opposite surface of the record. Still other means, including a second objective lens disposed across the second optical path, images the intermediate focus onto the storage track of the record through the aforesaid opposite surface of that record. The magnification factor of the first lens is so related to the magnification factor of the second lens that changes in the spacing of the said one surface relative to the first lens produce compensating changes in the spacing of the intermediate focus relative to the second lens. Finally, there are means responsive to energy of the reading beam reflected from the aforesaid opposite surface of the record for developing an output signal representing information stored in the record.

The record usually takes the form of a plastic video disc that is transparent to a laser beam and has a storage track inscribed in one surface. That surface, including the storage track, is covered by a reflecting metallic layer which contributes the property of reflectivity and at the same time protects the stored information. The laser is directed through the first lens to the flat reflecting layer and, after reflection, is brought to an intermediate focus which, in turn, is focused by means of a final or reading lens on the storage track, reaching the track through the body of the transparent disc. The optical system features self-compensating focus by properly relating the magnification factors of the lenses so that a change in the spacing of the disc from the first lens is compensated by a related change in the distance from the reading lens to the image of the intermediate focused light spot.

Brief Description of the Drawing

The features of the invention believed to be novel are set forth with particularity in the appended claims. The invention, together with further objects and advantages thereof, may best be understood by reference to the following description taken in conjunction with the accompanying drawing in the several figures of which like reference numerals identify like elements and in which:

FIG. 1 is a segment drawn to an enlarged scale of a reflective video disc to be read by a video playback device embodying the invention;

FIG. 2 is a fragmentary view of such a playback device, illustrating one form of self-compensating focus system;

FIGS. 3 and 5 are modifications of the focus system; and

FIGS. 4a and 4b concern optical elements that may be employed in a self-compensating focus system of the invention.

Description of the Preferred Embodiment

An optical type of playback device to which the invention has application reads information from a reflective, as distinguished from a transmissive, video record which can take the form of a flexible disc. The disc is constructed of a material, such as polyvinyl chloride, which has the capability of storing information to be derived, or read out by scanning the disc with a laser beam. It is most convenient, especially when the stored information is a continuous program, that the storage track be a multiturn spiral having elemental segments along the track which collectively constitute a spatial representation of a program-modulated carrier signal.

While the specifics of the storage track are subject to choice, a popular form features cavities or pits which alternate with lands to define the stored information. In preparing the master from which such a disc is processed, it is common practice to take a disc of glass, coated with a photosensitive material, and scan it with a laser beam which is controlled by a carrier signal frequency modulated with program information. Scanning with the laser causes the spiral track to have alternating segments of exposed and unexposed resist which, after development by treating the disc with a developer for the resist, produces the aforesaid succession of pits alternating with lands disposed in a spiral track and collectively constituting a spatial representation of the frequency modulated carrier signal employed in controlling the recording laser beam. Stampers prepared from such a master are used in replicating discs for distribution.

FIG. 1 shows a segment of a disc 10 which, preferably, is formed of polyvinyl chloride substrate, a substance transmissive to a laser reading beam. Actually, the disc section depicted in FIG. 1 is taken tangential to a track 11 constituting part of the multiturn spiral-shaped storage track formed on one surface of the disc. As shown in that drawing, track 11 comprises a train of pits interspersed with lands. The pitted surface of the disc is overlaid with a layer 12 of aluminum of sufficient thickness, in the order of 1 to 2 microns, to fill the pits of the record track and thereby provide a flat reflecting surface 12a atop track 11. This surface, in turn, may be covered with a coating 13 of lacquer. It will be appreciated that the record track 11, now covered by layer 12 and coating 13, is protected against dust, surface irregularities and the like. In reading such a disc, the reading beam must approach through the transparent substrate 10 and be focused on the track being read.

The program information recorded on the disc is of no consequence, insofar as the invention is concerned. It is customary, however, that it be a recording which corresponds to the NTSC format or to one sufficiently related to that format that transcoding from one form to the other is easily accomplished. For example, in that instance, reading of the disc may develop an output signal which is frequency modulated with the program information stored in the disc. It may be used directly or after transcoding, if necessary, to control a television receiver for image reproduction in either monochrome or color depending upon the information content of the stored program. Of course, the signal coding and transcoding, mastering and replication are well known in the art and of themselves constitute no part of the subject invention.

There is a choice with respect to disc thickness in that a thick rigid disc may be employed, or a thin flexible disc. The present invention is most particularly concerned with playback devices that employ flexible discs rotated at a high speed, of the order of 1800 rpm, in what is referred to as a flying technique. As shown in FIG. 2, a flexible disc 10 threads over a spindle and motor drive 15 with appropriate means (not shown) for removably securing the disc to the spindle to the end that the motor driven spindle rotates the disc at a predetermined speed.

Scanning or reading of the disc is accomplished by a laser beam supplied from a source 16 which is usually of the helium neon variety. Assuming for the moment a static situation, an inital lens 17 establishes a primary focus 18 of the beam. The optical system includes means for focusing this reading beam of energy onto one surface, specifically flat reflecting surface 12a, of the record. This focusing means comprises a first objective lens 19 disposed across a first optical path extending from laser source 16 to record 10 and having an axis 20.

The optical system has further means for directing the beam reflected from surface 12a, and returned through lens 19, along a second optical path which extends to an intermediate focus 25, and thence to the opposite or under surface of record 10. More particularly, this directing means includes a plurality of a least partially reflecting, as well as fully reflecting, surfaces which, for the embodiment of FIG. 2, comprises a first semi-transparent mirror 26, a solid reflecting mirror 27, another semi-transparent mirror 28, and a second solid reflecting mirror 29. The optical path that they collectively define causes reflected energy of the reading beam to be ultimately directed to track 11 essentially along the axis 20, but approaching disc 10 from the underside. In order to read out the information from the disc this second optical path includes means for imaging the intermediate focus or spot 25 onto the under surface of the record track. This means is a second objective or reading lens 30 disposed across the above described second optical path.

In operation, assuming disc 10 to be rotating in a desired reference or focal plane, light from laser 16 travels along the first optical path and is focused by lens 19 on the upper reflective surface 12a of the disc. Upon reflection, it is returned through lens 19 to mirror 26 where a portion is directed along the second optical path and comes to an intermediate focus 25. The beam is then focused by reading lens 30 upon track 11 of the disc. After further reflection due to aluminum layer 12, the beam energy, now modulated by the diffractive effect of the pits, is redirected along the second optical path by way of lens 30 and mirrors 29 and 28, in that order, to a light responsive means in the form of a photoreceptor 32 which, in known manner, develops an electrical output signal representative of tthe information stored in the record.

As noted above, the reading beam is focused upon the reflectively backed storage track 11 by lens 30. However, it can be expected that the track will depart from the focal point of lens 30 when the disc is being flown. In practice, then, the spacing between the top reflective surface 12a of the disc and lens 19 will vary with time. When that occurs, the location of the intermediate focus 25 likewise changes. The manner in which the inventive focus system effects a self-compensation of this defocusing will now be explained. First, the symbols employed in FIG. 2 are defined as follows:

$a_1$ represents the effective spacing between lens 19 and reflective surface 12a $a_2$ represents the effective spacing between lens 19 and focus point 25

$b_1$ represents the effective spacing between lens 30 and track 11

$b_2$ represents the effective spacing between lens 30 and focus point 25

$m_{19} = a_2/a_1$ = magnification of lens 19

$m_{30} = b_2/b_1$ = magnification of lens 30

$\Delta$ represents a displacement of reflective surface 12a from a reference position.

Assume now that surface 12a of the disc departs from the reference plane (toward lens 19) by an incremental distance $\Delta$, the focus of the beam established by lens 19 is then displaced from its original location by twice that incremental distance, or by $2\Delta$. Consequently, the distance $a_2$ from lens 19 to the intermediate focal point 25 increases, moving the intermediate spot vertically downward, as viewed in FIG. 2, by $2\Delta(m_{19})^2$. As a result, the distance $b_2$ decreases by the same amount while the distance $b_1$ increases by an amouunt $2\Delta(m_{19})^2/(m_{30})^2$. This increases tends to compensate for the out-of-focus condition occasioned by disc displacement.

Out-of-focus conditions may be avoided and a self-compensating property imparted to the optical system by appropriately relating the magnification factors of lenses 19 and 30. In particular, if the ratio of the magnification factor $m_{30}$ of reading lens 30 to the magnification factor $m_{19}$ of lens 19 is substantially equal to $\sqrt{2}$, compensation is achieved. Where the magnification factors of the lenses are thus related, any change in distance $a_1$ caused by displacement of disc 10 produces a compensating change in distance $b_1$ and maintains the beam properly focused on the storage track of the disc. This compensation of focus, however, is realized for a limited range of displacements of the disc from its nominal or reference position. For large displacements of the disc, the relationship between the changes in distances $a_1$ and $a_2$ becomes non-linear and the focus of reading lens 30 no longer follows and compensates for displacement of the disc. A useful range of displacement (perhaps $\pm$ 100 $\mu$m) is, nevertheless, accommodated. Further improvement in the range of linearity is the subject of a co-pending application of Leonard Laub, Ser. No. 545,245, filed Jan. 29, 1975 (Docket No. 2098), and assigned to the assignee of the present invention.

The embodiment of FIG. 2, while effective in accomplishing self-compensating focus in the optical system, suffers from loss of energy of the reading beam because of the use of semi-transparent mirrors 16 and 28. Any such mirror transmits part and reflects part of an incident beam and, therefore, energy loss at each such mirror is experienced. This embodiment is also subject to the disadvantage that a portion of the reflected light traversing lens 19 may re-enter laser 16. Difficulties of these types may be overcome in known fashion by utilizing a polarization-dependent beam splitting mirror in combination with a quarter-wave plate in substitution for one or both of mirrors 26 and 28, but this may be undesirably expensive. A different approach is shown in FIG. 3, featuring the use of incomplete solid mirrors. In this embodiment a segmented mirror 26' extends only partially across the first optical path, the one having an optical axis 20. It preferably extends to that axis, serving as a beam splitter. With respect to the light arriving from the laser, this occasions an energy loss similar to that experienced at mirror 26 in the embodiment of FIG. 2. No further energy is lost, however, when the light reflected from the top surface 12a of disc 10 strikes mirror 26'. If mirror 28' in the second optical path is likewise made an incomplete solid mirror, just as mirror 26', there is no additional loss of energy at that point in the optical system so that the system is now characterized by an improved efficiency.

The use of simple beam splitters 26' and 28' will tend to cause the laser beam to have a semi-circular cross-section. While the system is operative with such optical elements, less severe changes in beam shape result from use of optical elements of the type shown in FIG. 4a. These are characterized by having an odd number of sectors 40 that are reflective and an interlaced like number of sectors 41 that are transmissive to the reading beam. Of course, the number of such elements is subject to choice and is not limited to the 6-element embodiment illustrated.

In defining the second optical path over which the beam energy, after reflection from surface 12a of disc 10, travels to reading lens 30, it is necessary to use mirrors that are tilted or mounted at approximately 45°. The mirrors should have an essentially elliptical configuration as shown in FIG. 4b so that, if they were tilted 45° about axis $x - x$, the reflected beam is substantially circular in cross-section.

Optical playback devices of the type under consideration require servo mechanisms to maintain proper tracking registration of the reading beam with the storage track of the disc. For example, it is commonplace to have mirror 29 subject to angular adjustment about a central axis in order to displace the reading beam radially of disc 10 in the proper direction and appropriate amount to maintain radial tracking registration. This is well understood and is usually achieved by arranging elements of photoreceptor 32 to develop an error signal having a polarity and amplitude indicative of the sense and extent of radial misregistration. Use of that error signal to effect controlled displacement of mirror 29 maintains proper registration. If this type of radial servo is included in the arrangement of FIG. 3, it is apparent that there is a possibility the reading beam directed to photoreceptor 32 may undesirably impinge at least partially on mirror 28'. The possibility of that happening may be minimized by having the spacing of mirrors 28' and 29 as small as possible, reducing the lever arm to a minimum. Alternatively, the further modification of FIG. 5 may be adopted. In this case, the mirror 29' is an incomplete solid mirror, extending only to the optical axis of the light path through reading lens 30. In that embodiment the photoreceptor is positioned along the axis 20 and the light reflected from the storage track is returned in that direction to the photoreceptor.

While there has been described a particular embodiment of the present invention, it is apparent that changes and modifications may be made therein without departing from the invention in the broader aspects. The aim in the appended claims, therefore, is to cover all such changes and modifications as fall within the true spirit and scope of the invention.

What is claimed is:

1. A self-compensating focus system for an optical video playback device for reading a program record which is reflective to a beam of energy, said record having one surface that is a plain reflector and an opposite surface through which a reading beam may gain access to information stored in said record, said system comprising:

means, including a first objective lens disposed across a first optical path, for focusing a reading beam of energy on said one surface of said record;

means, including a plurality of at least partially reflecting surfaces, for directing energy reflected from said one surface of said record and returned through said first lens along a second optical path to an intermediate focus and then to the opposite surface of said record;

means, including a second objective lens disposed across said second optical path, for imaging said intermediate focus onto said opposite surface of said record, the magnification factor of said first lens being related to the magnification factor of said second lens so that changes in the spacing of said one surface relative to said first lens produce compensating changes in the spacing of said intermediate focus relative to said second lens so that said reading beam remains focused on said opposite surface of said record; and means responsive to energy from said reading beam reflected from said opposite surface of said record for developing an output signal representing information stored in said record.

2. A self-compensating focus system in accordance with claim 1 in which said directing means includes a semi-transparent mirror disposed in both of said optical paths so that the reading beam addresses said one surface of said record and is directed to said opposite surface of said record through said mirror.

3. A self-compensating focus system in accordance with claim 1 in which said directing means includes a pair of semi-transparent mirrors, one of which is disposed in said first optical path to admit said beam to said first lens while the other is disposed in said second optical path to deliver energy reflected from said opposite surface of said record to said output signal developing means.

4. A self-compensating focus system in accordance with claim 1 in which said directing means includes a first solid mirror extending half way across said first optical path to deflect energy of said beam reflected from said one surface of said record along said second optical path and further includes a second solid mirror extending half way across said second optical path to direct beam energy to said second lens but out of the path of energy of said beam reflected from said opposite surface of said record.

5. A self-compensating system in accordance with claim 1 in which the ratio of the magnification factor of said second lens to the maginification factor of said first lens is substantially equal to $\sqrt{2}$.

6. A self-compensating focus system in accordance with claim 1 in which at least one of said reflecting surfaces is a solid mirror disposed in one of said optical paths but extending only partially thereacross to function as a beam splitter.

7. A self-compensating focus system in accordance with claim 6 in which said mirror extends as far as the optical axis of the path in which it is disposed.

8. A self-compensating focusing system in accordance with claim 1 in which said beam directing means includes at least one optical element having an odd number of sectors that are reflective to said reading beam and an interlaced like number of sectors that are transmissive to said beam.

9. A self-compensating focus system in accordance with claim 8 in which said optical element is positioned at an approximate 45° relative to the optical axis of the optical path in which it is included and further in which said optical element is essentially of elliptical configuration.

* * * * *